Jan. 9, 1951　　　　　C. G. MINOR　　　　　2,537,363
TILTABLE CABINET
Filed Feb. 21, 1946　　　　　　　　　　　　　12 Sheets-Sheet 1

Inventor
Charles G. Minor
By Albert G. McCabe
Atty.

Jan. 9, 1951 C. G. MINOR 2,537,363
TILTABLE CABINET
Filed Feb. 21, 1946 12 Sheets-Sheet 2
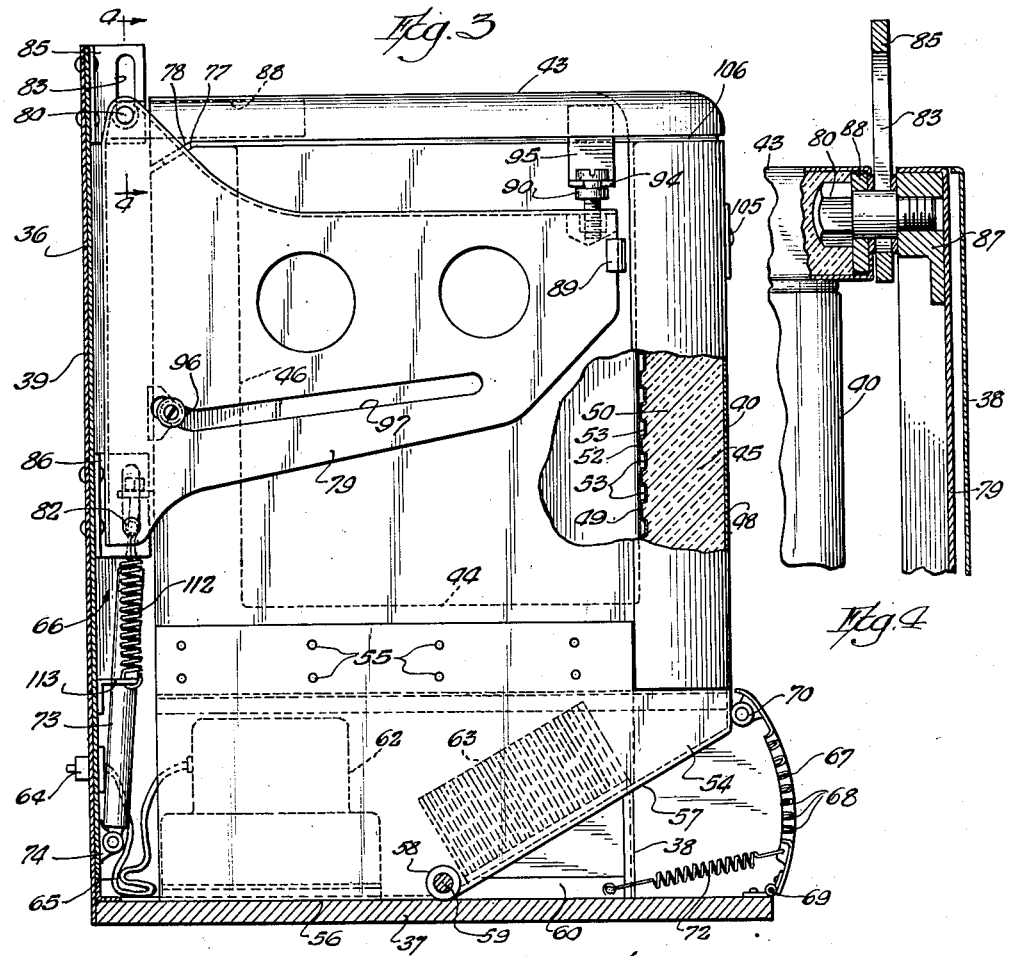
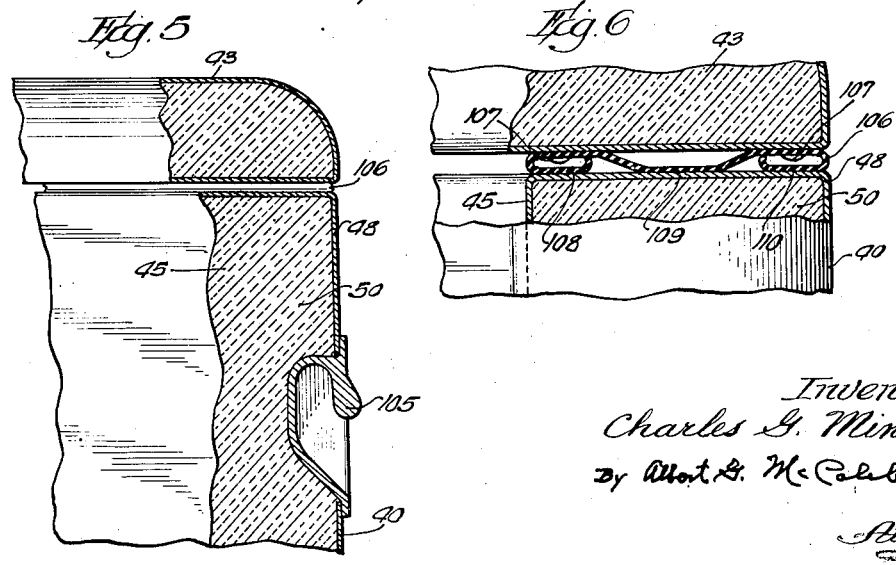
Inventor
Charles G. Minor
By Albert G. McCaleb
Atty

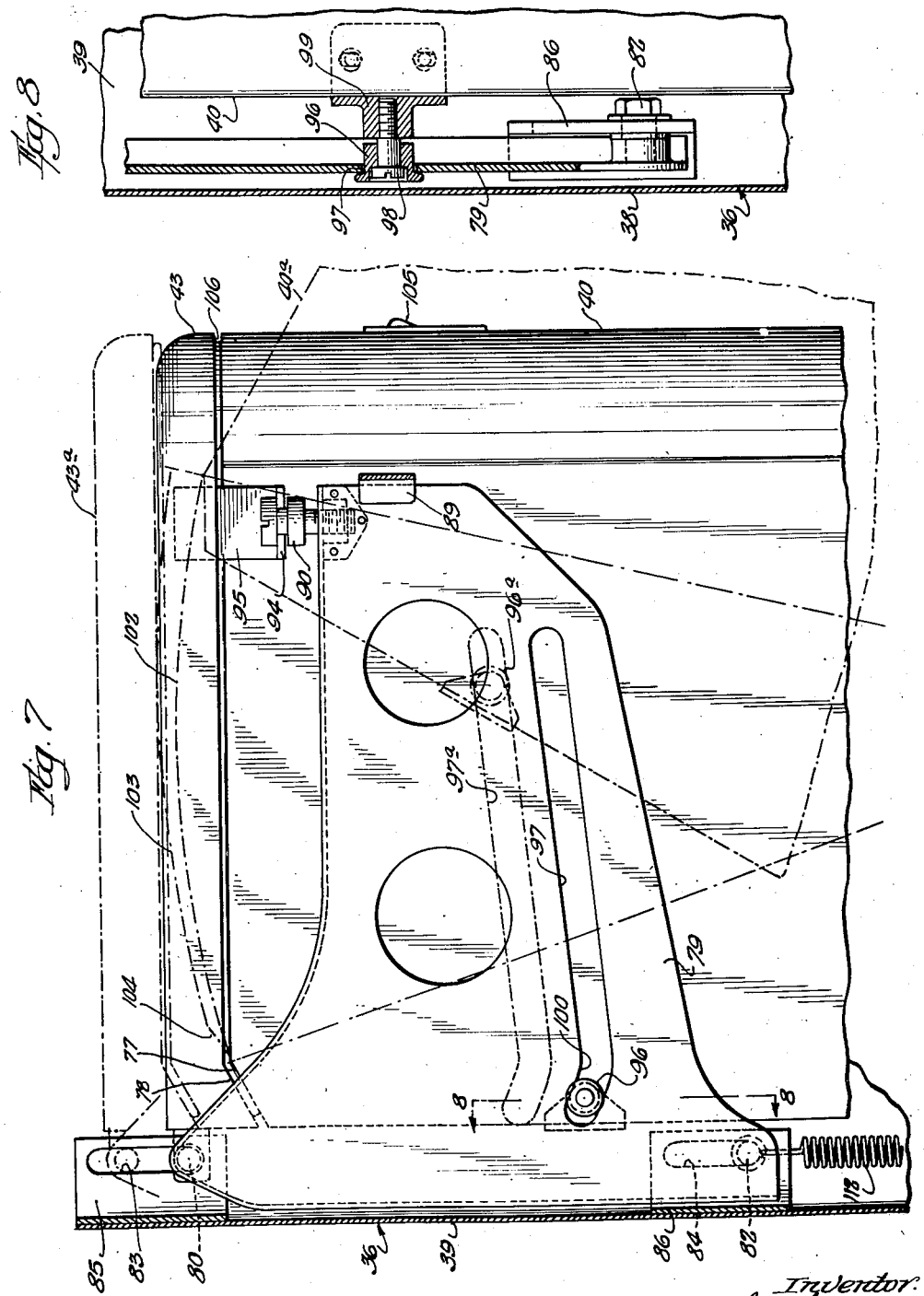

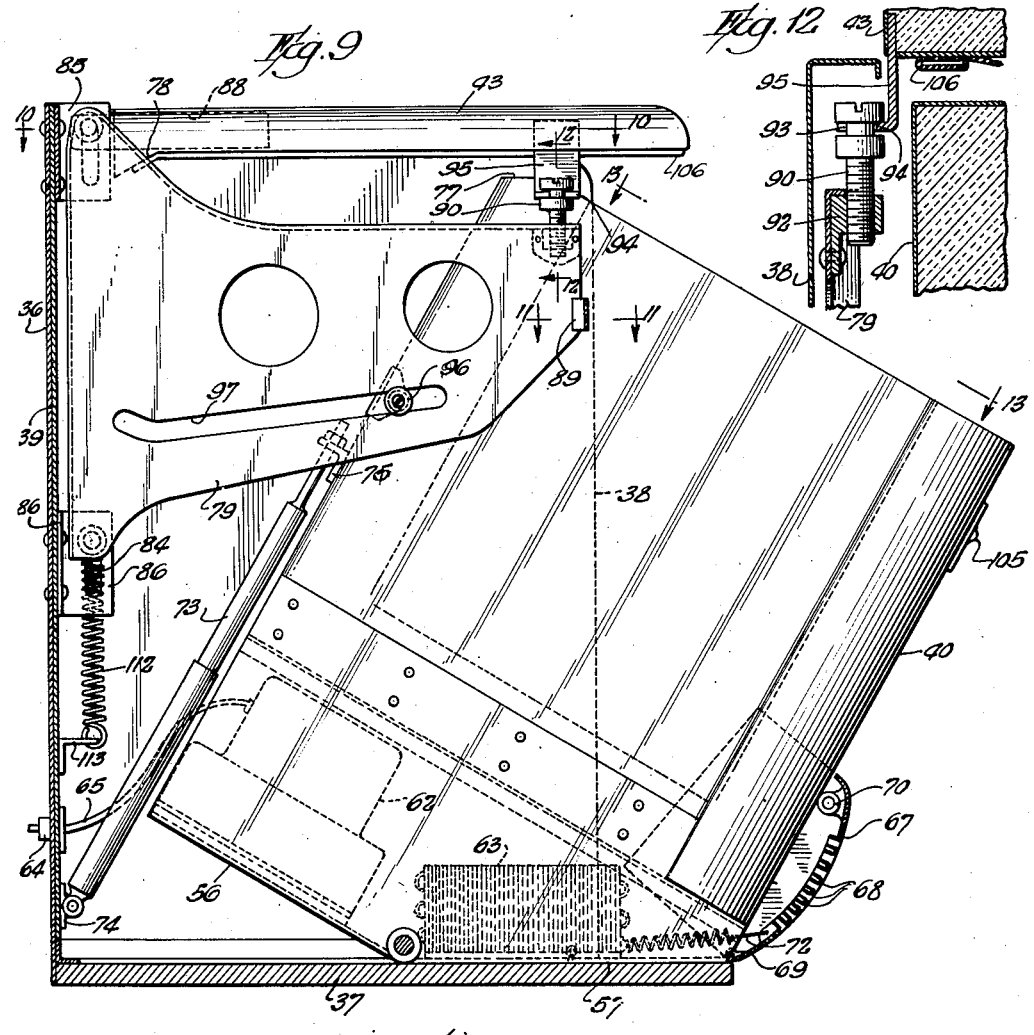

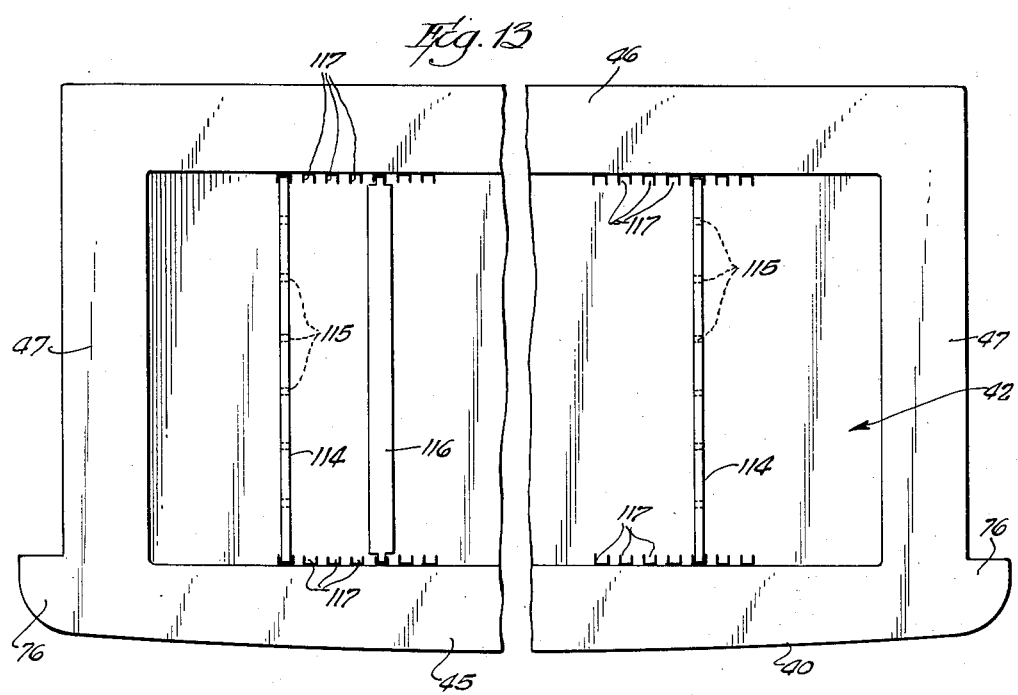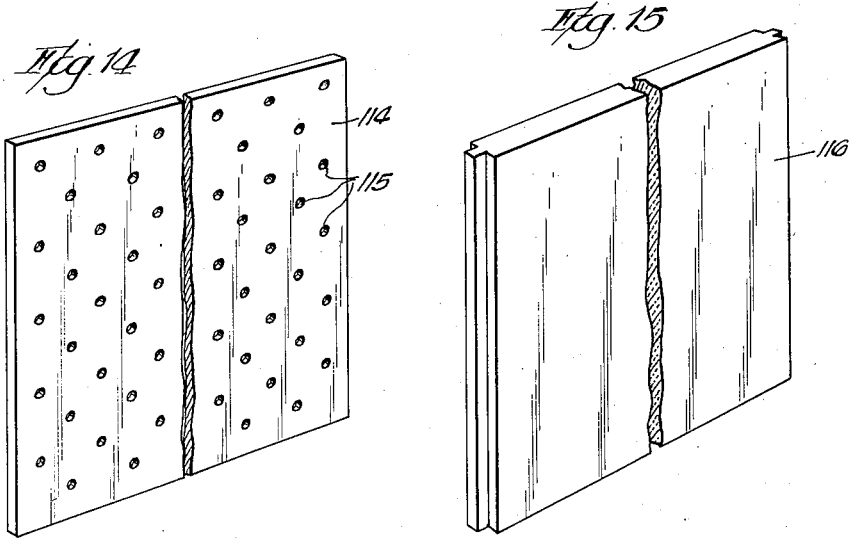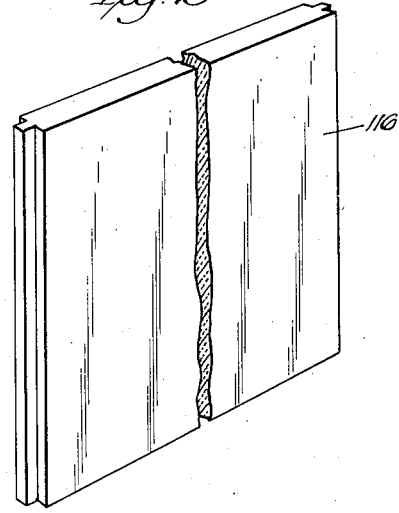

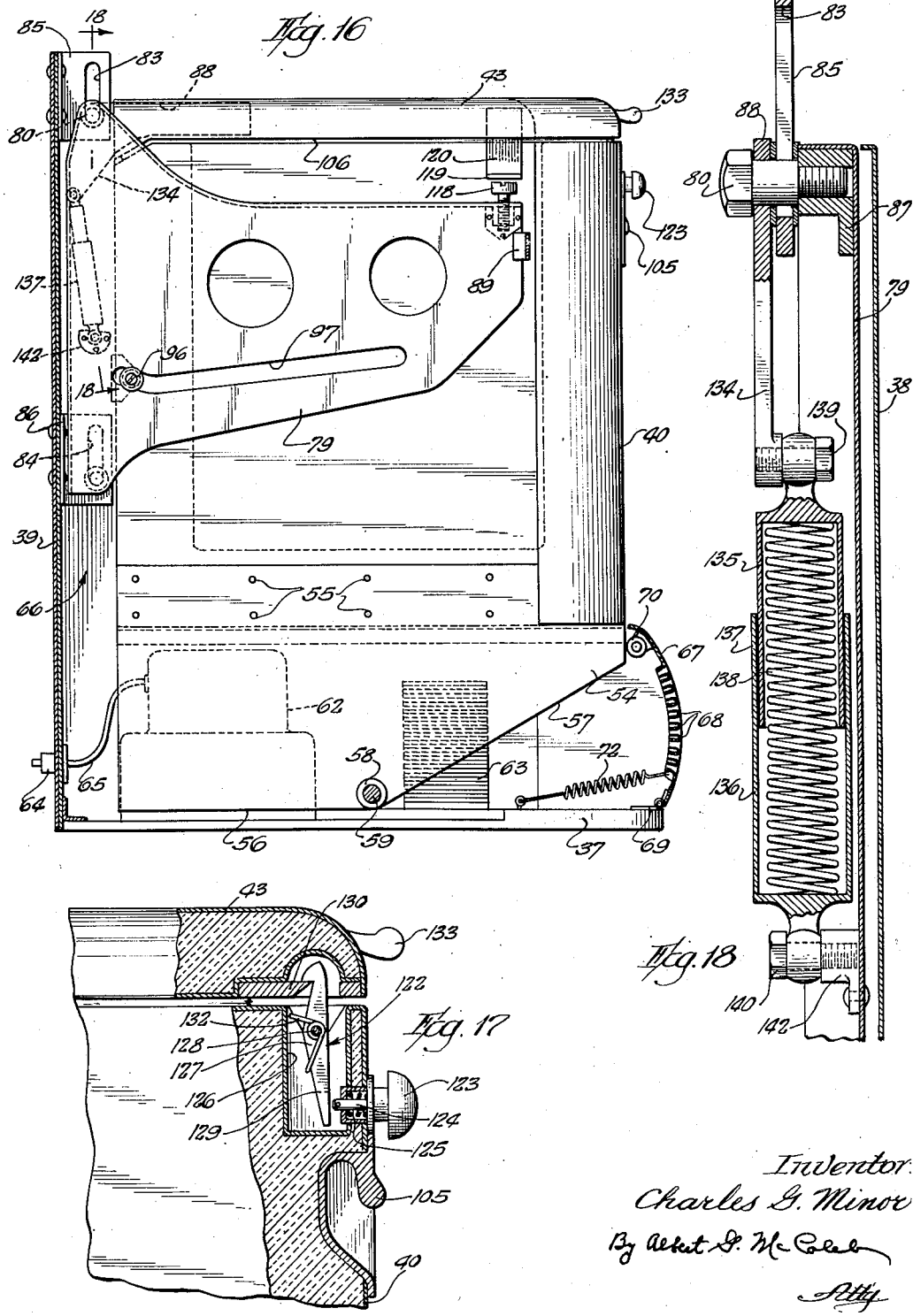

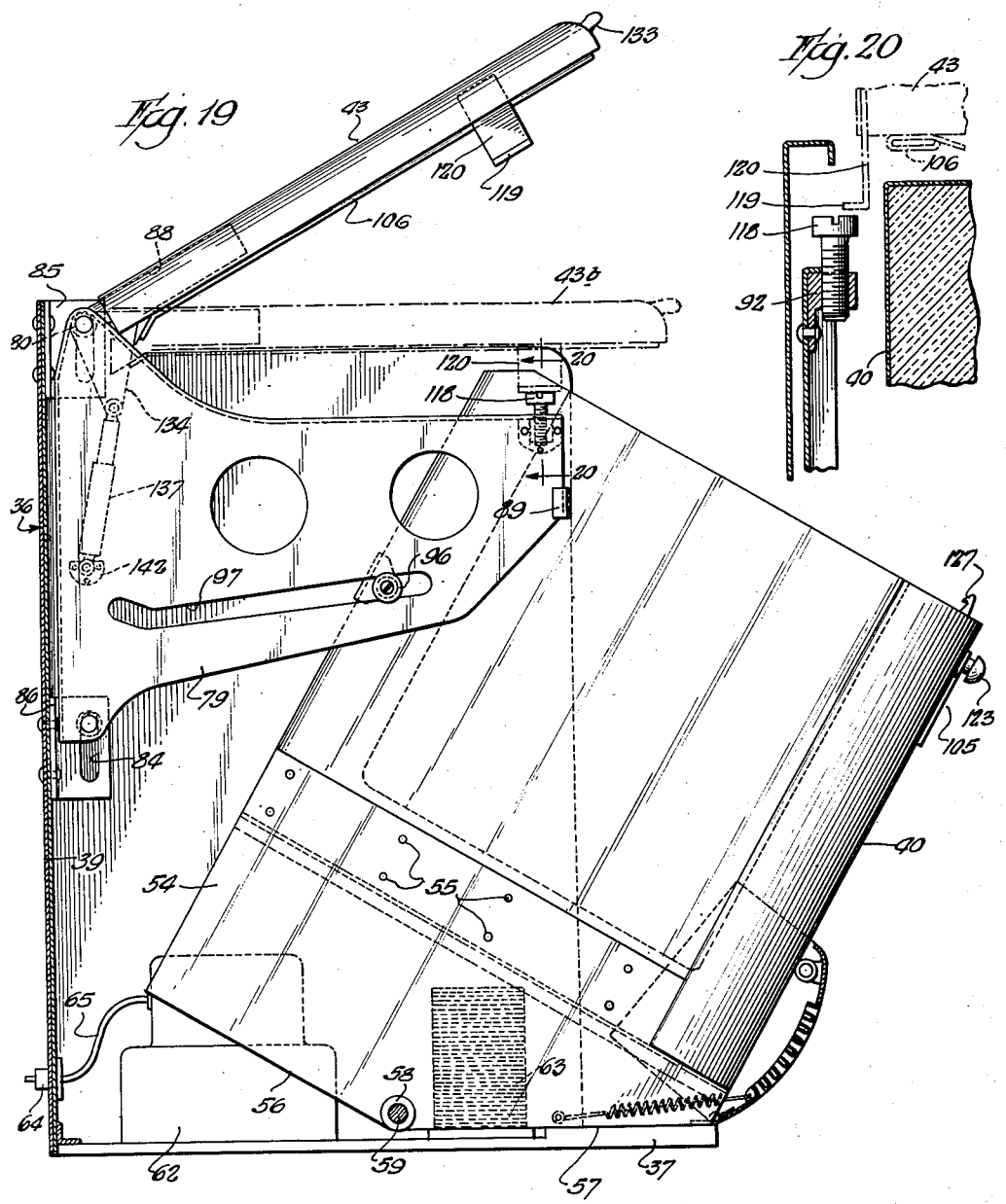

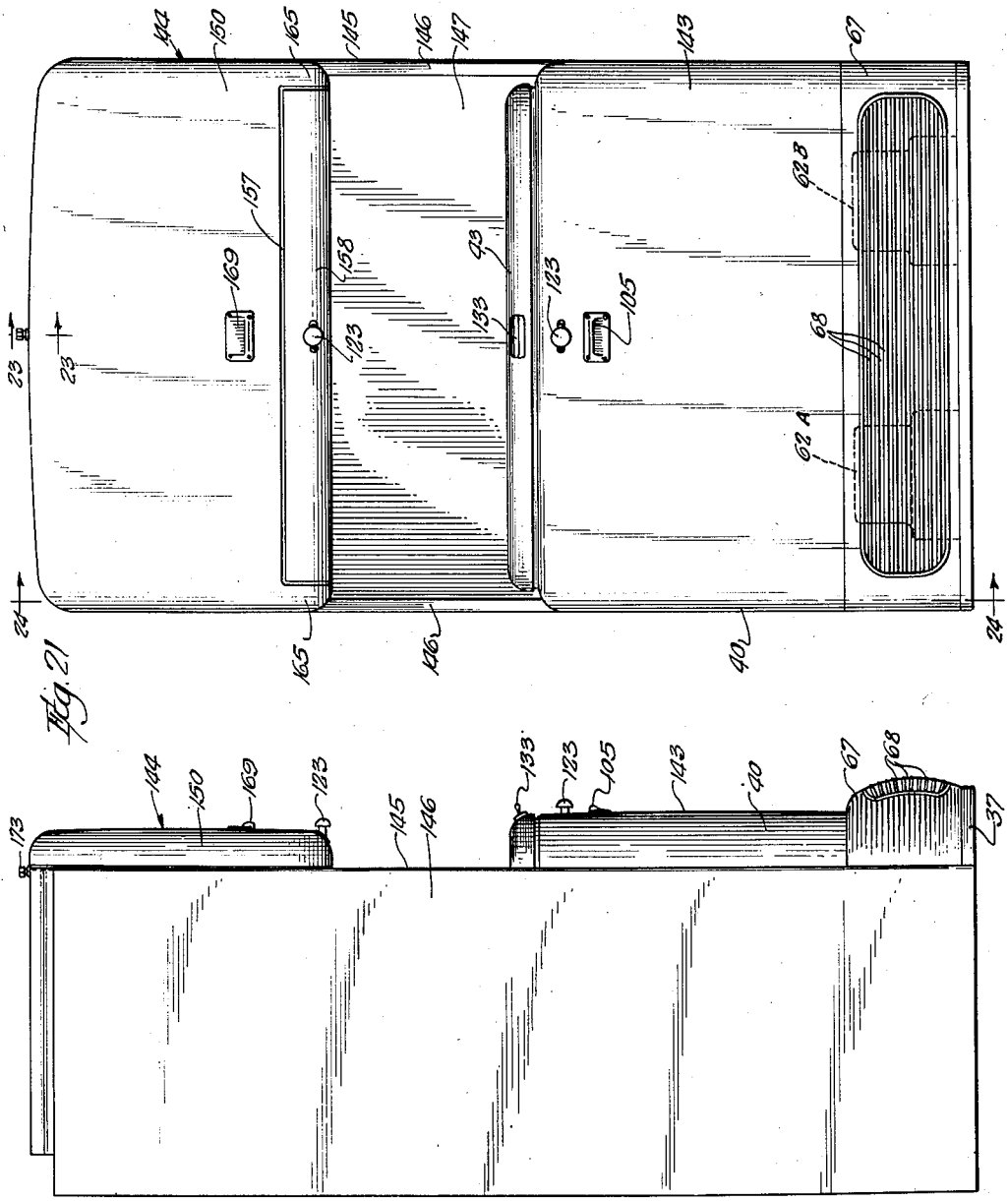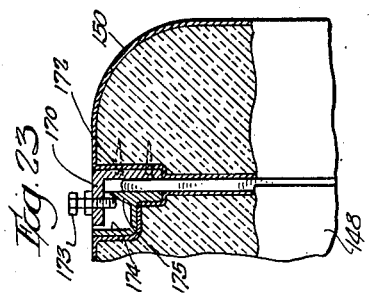

Jan. 9, 1951

C. G. MINOR 2,537,363

TILTABLE CABINET

Filed Feb. 21, 1946

Inventor:
Charles G. Minor
By Albert D. McColoh
Atty

Jan. 9, 1951  C. G. MINOR  2,537,363
TILTABLE CABINET
Filed Feb. 21, 1946  12 Sheets-Sheet 10
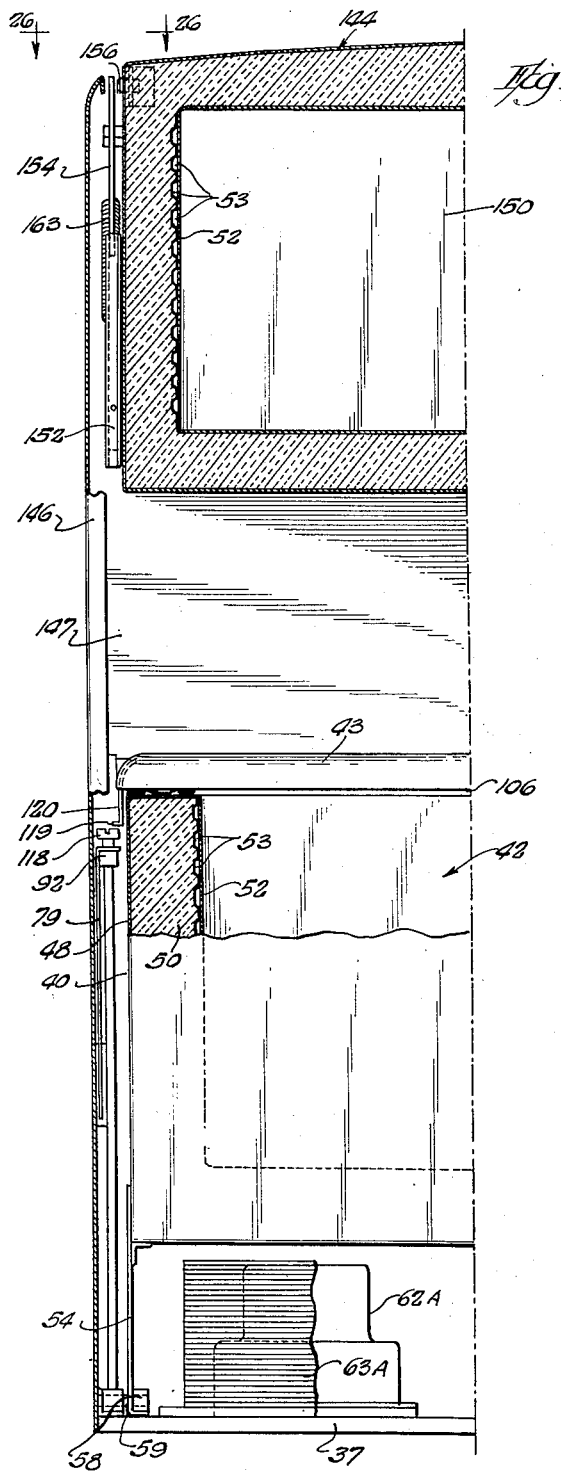
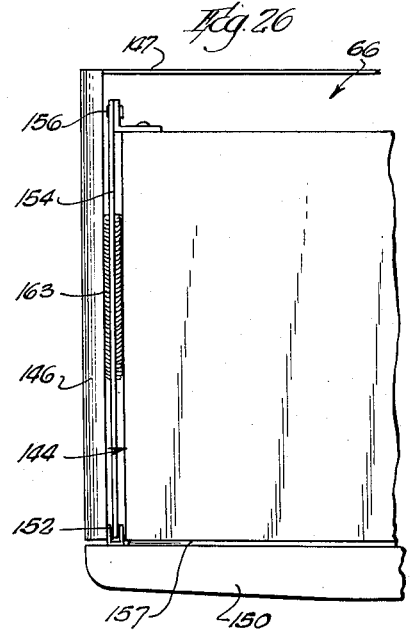
Inventor:
Charles G. Minor
By: Albert I. McColly
Atty.

Jan. 9, 1951 C. G. MINOR 2,537,363
TILTABLE CABINET
Filed Feb. 21, 1946 12 Sheets-Sheet 11
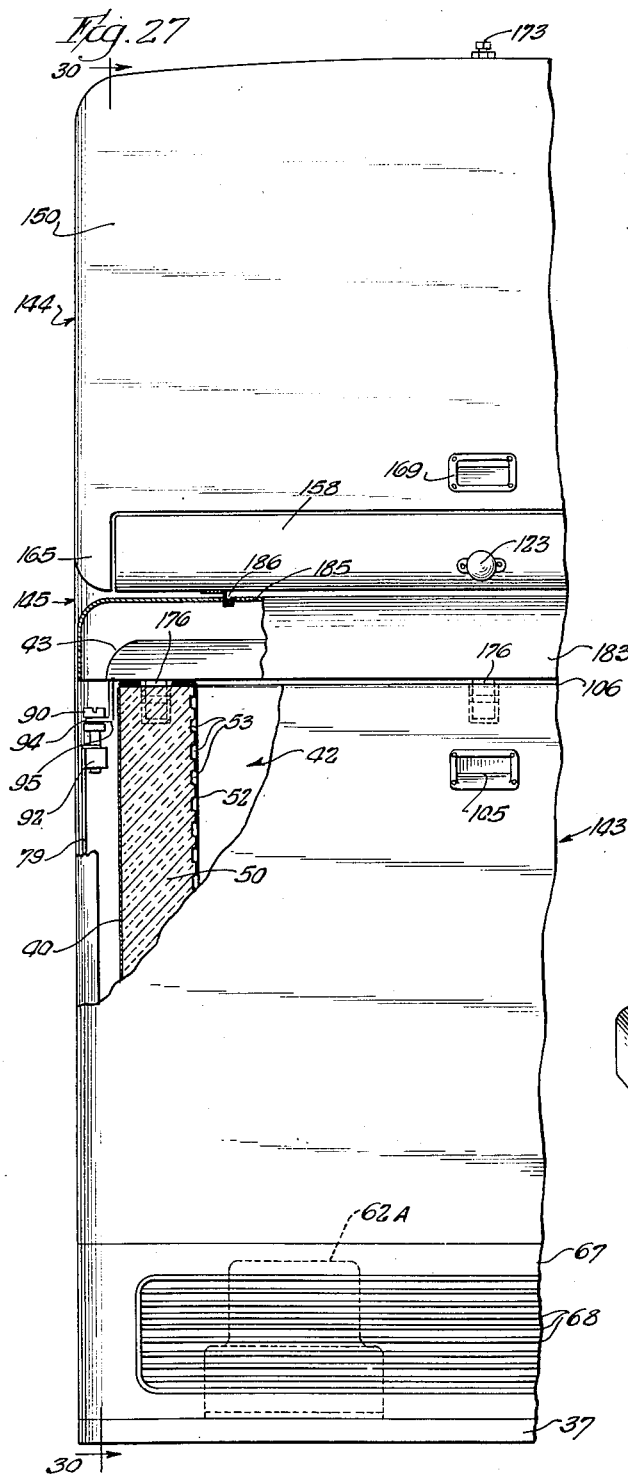
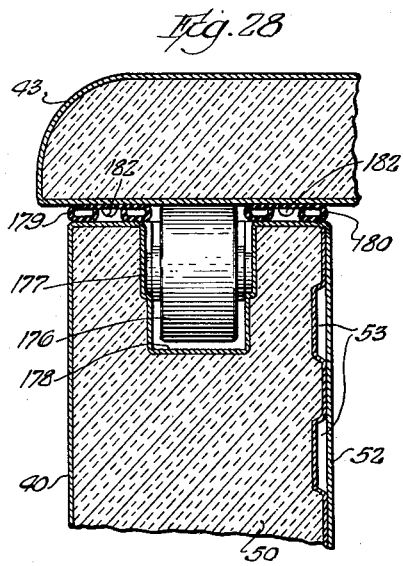
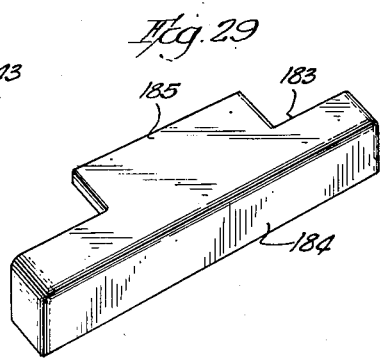
Inventor
Charles G. Minor
By Albert G. McCaleb
Atty Jan. 9, 1951  C. G. MINOR  2,537,363
TILTABLE CABINET
Filed Feb. 21, 1946  12 Sheets-Sheet 12
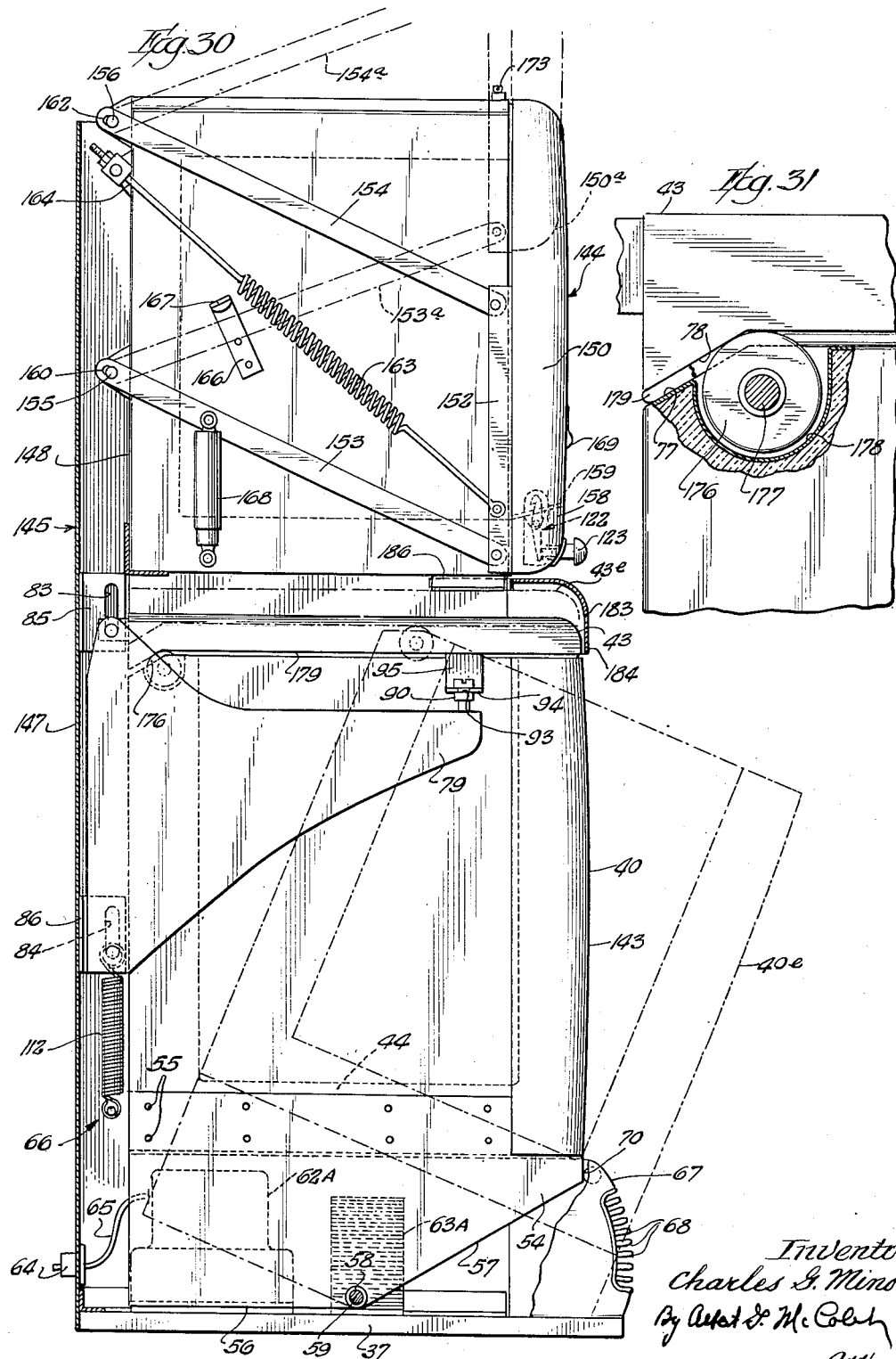
Inventor
Charles G. Minor
By Albert S. McColey
Atty.

Patented Jan. 9, 1951

2,537,363

UNITED STATES PATENT OFFICE 2,537,363

TILTABLE CABINET

Charles G. Minor, Evanston, Ill., assignor of one-half to Albert G. McCaleb, Evanston, Ill.

Application February 21, 1946, Serial No. 649,240

15 Claims. (Cl. 312—155)

My present invention relates to tiltable refrigerator cabinets, and more particularly to those adapted to use for food preservation and storage in homes, stores, restaurants and the like, and wherein a unitary cabinet may have a compartment suited to freezing of foods and/or storage of frozen foods or the preservation of foods by cooling without freezing, or compartments for both kinds of food preservation.

Some of the subject matter disclosed but not claimed herein is covered in my co-pending application Serial No. 164,111, filed May 25, 1950, and entitled "Refrigerator Cabinets."

Added to the multitudinous problems confronted in refrigerator cabinet design with respect to the provision of a well insulated and efficient cabinet, as well as those related to manufacturing processes and costs, there are also, in addition to general appearance, those further considerations concerned with accessibility and visibility of the contents, convenience of adding to and removing articles from the contents of the cabinet and the ratio of storage space to the useful space in a room which is occupied by the cabinet and necessarily kept clear for its use. While the refrigerator cabinets disclosed herein for illustrative purposes comprise designs calculated to include provisions for good heat insulation and to take advantage of many factors contributing efficiency and durability, as well as sound manufacturing practices, particular attention has been paid to the improvements of accessibility, visibility and classification of the contents, convenience of use, and large capacity in proportion to the room space required, as well as general utility and appearance.

It is, therefore, among the more general objects of my invention to provide refrigerator cabinets embodying features of sound structural design and which are generally improved from the standpoints of utility and convenience in use.

As another object, the present invention comprehends the provision of refrigerator cabinets constructed and arranged to promote improved ease of access to all parts of the interior.

My invention further contemplates the provision of refrigerator cabinets wherein a part which serves an essential function in the cabinet structure may also be used as a conveniently disposed utility shelf when the cabinet is either open or closed, and which utility shelf is particularly well placed and suited to use during placement of material in or removal of material from the cabinet.

Another object of my invention is to provide refrigerator cabinets in which the opening of the cabinets is effected by relatively movable cabinet parts and in a manner such that air turbulence at the opening and the resultant interchange of heat and moisture between the chilled air within the cabinet and the surrounding atmosphere are definitely limited.

The present invention has for another object the provision of refrigerator cabinets in which the cover and body portion of the cabinet are so movable relative to one another for opening the cabinet that, while free access is provided to the interior without the necessity of manually holding one of the parts, the cover may be utilized as an adjacent loading or unloading shelf before, during and/or after the opening movement.

For a further object, my present invention contemplates the provision of refrigerator cabinets provided with insertable and movable separators of either a heat conducting type adapted to use in segregation and classification of the contents, or of a heat insulating type suited to the segregation of a quick freezing section, the establishment of varying temperature zones within the cabinet, and the like.

It is further contemplated, as an object of the present invention, to provide refrigerator cabinets in which the closure means is normally biased toward its closed position so as to effect a good heat insulating seal between the parts which are separable for opening.

My invention also provides a structure for refrigerator cabinets which permits the combination into a unitary assembly of a food freezing and storage cabinet and a cabinet operating at a temperature suited to food preservation without freezing, which unitary assembly occupies only a relatively small percentage more floor space than the usual cabinets of either type and of like capacity.

In addition to providing refrigerator cabinets having one or more of the aforementioned features, I have also provided cabinets with the mechanical refrigeration units housed therein and which have ample provision for the circulation of cooling air around the refrigeration units.

As an additional feature, it is an object of my present invention to provide refrigerator cabinets in which frosting and thermosyphonic action are minimized.

Other objects and advantages of the invention will be apparent from the following description and the accompanying drawings in which similar characters of reference indicate similar parts throughout the several views.

Referring to the twelve sheets of drawings:

Fig. 3 is an end sectional view of the refrigerator cabinet shown in Figs. 1 and 2 with the parts in their normally closed relationship and with portions cut away to illustrate certain details of the structure;

Fig. 4 is an enlarged fragmentary sectional view of a portion of the refrigerator cabinet structure illustrated in Fig. 3, with the section taken substantially on a line 4—4 of Fig. 3;

Figs. 5 and 6 are each fragmentary views drawn to an enlarged scale of portions of the refrigerator cabinet structure shown in Figs. 1 to 3, inclusive, and each of which has cut away portions for the illustration of structural details;

Fig. 7 is a fragmentary end elevational view of a portion of the structure shown in Fig. 3, but drawn to a larger scale and depicting the movements of certain parts of the refrigerator cabinet in passing between the open and closed positions;

Fig. 8 is a fragmentary sectional view to an enlarged scale of a portion of the refrigerator structure shown in Fig. 7 and wherein the section is taken substantially on a line 8—8 of Fig. 7;

Fig. 9 is a view similar to Fig. 3, but depicting the relative positions of the refrigerator cabinet parts when the cabinet is open for access to the interior;

Figure 24:
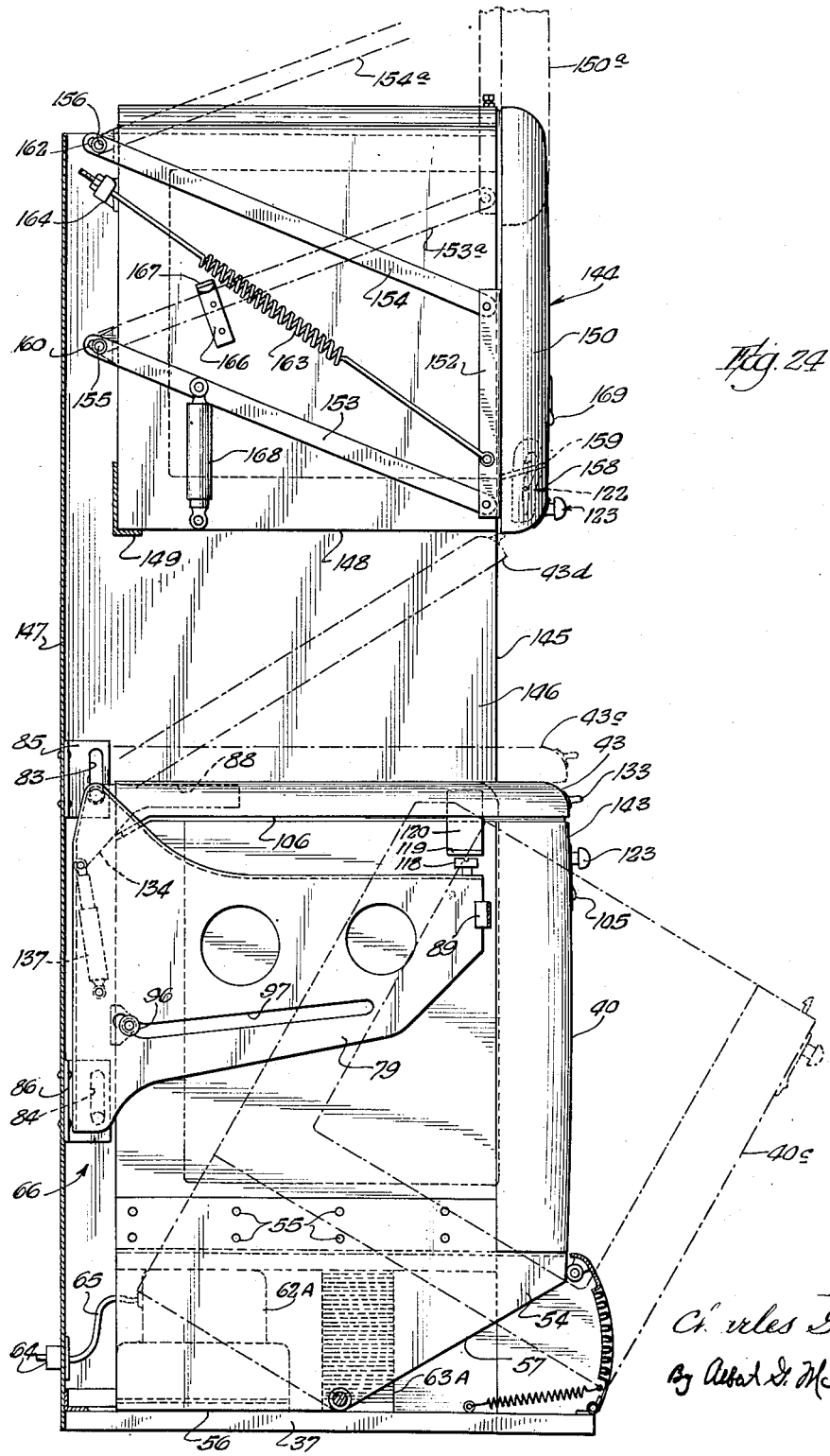

Figs. 10, 11 and 12 are respectively fragmentary sectional views to an enlarged scale of portions of the refrigerator cabinet structure shown in Fig. 9, and wherein the sections are taken substantially on lines 10—10, 11—11, and 12—12 of Fig. 9;

Fig. 13 is a top plan view of a portion of the refrigerator cabinet structure shown in Fig. 9 when viewed substantially as indicated by a line 13—13 in Fig. 9 and in the direction indicated by the arrows;

Figs. 14 and 15 are fragmentary perspective views of removable supplementary parts adapted to use in my preferred refrigerator cabinet in a manner such as that indicated in Fig. 13;

Fig. 16 is an end sectional view similar to Fig. 3 of a refrigerator cabinet embodying my invention and which includes modifications of certain parts and details of structure;

Fig. 17 is a fragmentary sectional view of a portion of the refrigerator cabinet structure illustrated in Fig. 16;

Fig. 18 is a fragmentary sectional view to an enlarged scale of a portion of the structure shown in Fig. 16 with the section taken substantially on a line 18—18 of Fig. 16;

Fig. 19 is an end sectional view similar to Fig. 16 but showing the disposition of the parts of the refrigerator cabinet when in the open position;

Fig. 20 is a fragmentary sectional view to an enlarged scale of a portion of the refrigerator cabinet structure shown in Fig. 19 with the section taken substantially on a line 20—20 of Fig. 19;

Figs. 21 and 22 are respectively front and side elevational views of a refrigerator cabinet embodying further modifications of my present invention;

Fig. 23 is a fragmentary sectional view to an enlarged scale of a portion of the refrigerator structure shown in Fig. 21 with the section taken substantially on a line 23—23 of Fig. 21;

Fig. 24 is a side sectional view of the refrigerator cabinet structure shown in Figs. 21 and 22 and wherein the section is taken substantially on a line 24—24 of Fig. 21;

Fig. 25 is a front view of a portion of the refrigerator cabinet structure shown in Fig. 21 with parts cut away at various portions of the cabinet structure to illustrate certain internal details;

Fig. 26 is a fragmentary top plan view of a portion of the refrigerator cabinet structure depicted in Fig. 25 and viewed substantially as indicated by a line 26—26 in Fig. 25 and the accompanying arrows;

Fig. 27 is a fragmentary front elevational view of a refrigerator cabinet embodying additional modifications of this invention and having portions cut away to show details of internal structure;

Fig. 28 is a fragmentary sectional view to an enlarged scale of a portion of the refrigerator cabinet structure shown in Fig. 27;

Fig. 29 is a perspective view of a part of the refrigerator cabinet structure illustrated in Fig. 27;

Fig. 30 is a side sectional view of my refrigerator cabinet structure which is shown in Fig. 27 and wherein the section is taken substantially on a line 30—30 of Fig. 27; and Fig. 31 is a fragmentary side view to an enlarged scale of a portion of the structure shown in Fig. 30 and including a cut away section to illustrate certain details of internal structure.

The various views and forms of my invention which are depicted in the accompanying drawings are illustrative of certain structural features and principles of my invention as well as exemplary of structural modifications and variations which may be made without departing in any way from the purview of the invention. On the contrary, such modifications and variations have been illustrated by way of indication of the range of adaptations of the invention rather than to depict limitations.

In order to simplify the description of the various illustrative and modified forms of my invention and because of the considerable number of substantially similar parts in the various forms, those similar parts will be referred to by like reference numerals throughout the several views and the descriptions of such parts will be considered to apply to all of the views, except in respect to the differences particularly pointed out.

Figs. 1 to 15, inclusive, illustrate a preferred embodiment of my refrigerator cabinet which is well adapted, although not limited, to use for the preservation of frozen foods and the like and/or the freezing or storage of foods and the like. In such an adaptation the temperature of the interior of the cabinet is maintained at a lower value than in refrigerators used for the preservation of foods at temperatures above that at which they will freeze. Usually when foods are frozen for storage or preserved in their frozen state, the expected time of preservation is longer than for the preservation of foods at temperatures above freezing, and, as a general rule, such foods when frozen are in a solid state. Thus they may be packed within the refrigerator cabinet in closely spaced relationship and without the desirability of having momentary access to any one of a wide variety of the stored articles. Although classification by segregation is desirable in any instance, some articles may be removed from the interior of the cabinet to accomplish the infrequent access to others and without detriment, over a reasonable period, to the removed frozen articles.

Since the frozen foods and the like may be closely packed within the refrigerator cabinet, a compact cabinet of reasonably small volume furnishes storage capacity for a considerable amount of such frozen food. In my refrigerator cabinet which is depicted in Figs. 1 to 15, inclusive, I have not only taken into account the provision of a cabinet having an easily accessible interior within easy view of the user and which provides a large storage space as compared with the room space occupied thereby, but I have also provided a cabinet which limits the heat loss due to opening and closing, and provides a shelf which is particularly useful in an adaptation to the storage of frozen foods because of its usefulness during loading and unloading of the cabinet or during the removal and replacement of articles when access is desired to those beneath the ones at the top of the cabinet.

Figure 1:
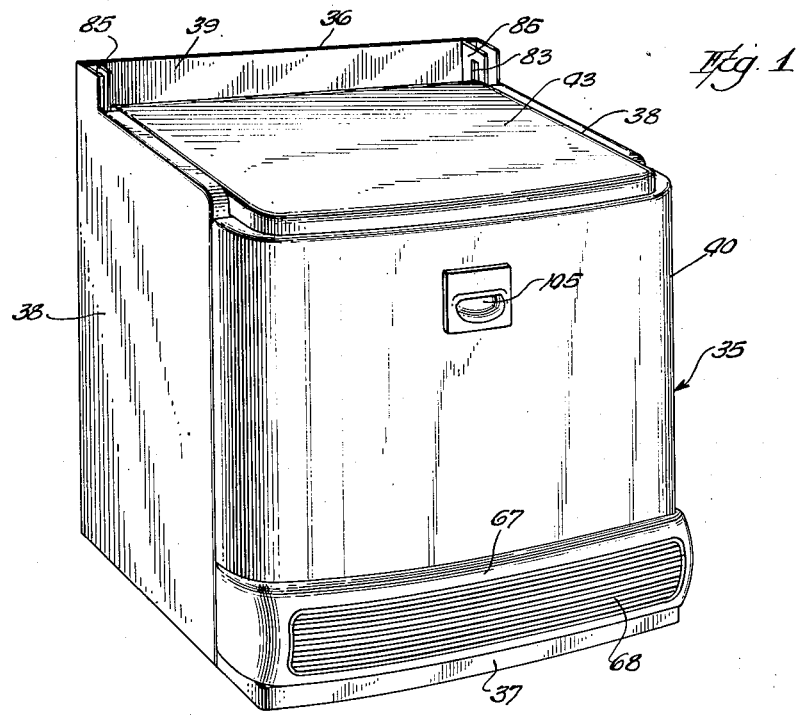
Figs. 1 and 2 are respectively perspective views of a refrigerator cabinet embodying a preferred form of my invention which depict the positions of the parts in their closed and open positions.
Figure 2:
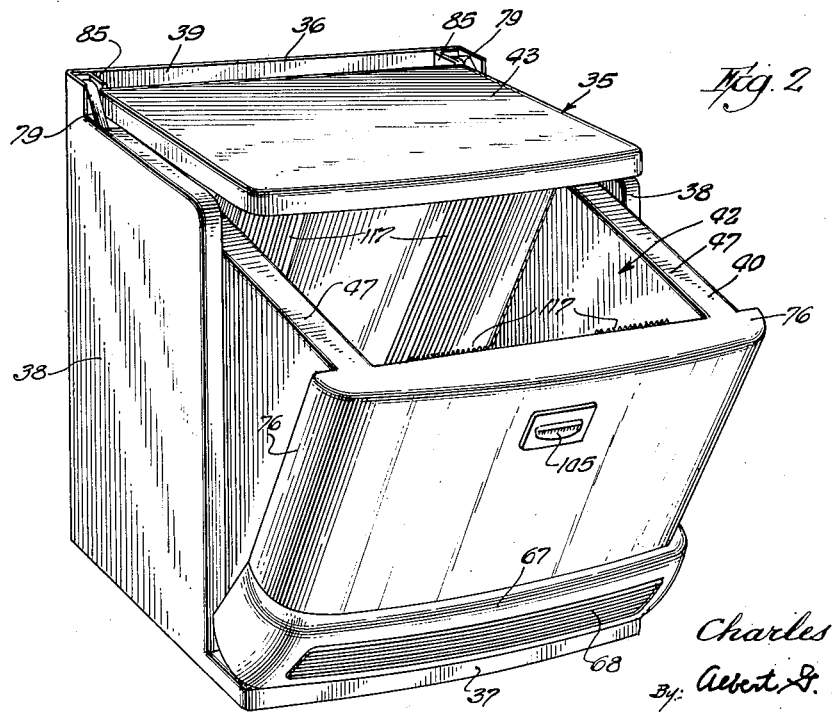

Generally considered, and as depicted in Figs. 1 and 2, the refrigerator cabinet 35 includes an outer casing 36 which comprises a base 37 to which are secured opposed and upwardly extending end walls 38 and a back wall 39. The base 37 may be made of either metal or wood, while the end walls 38 and back wall 39 are preferably made of suitably cut and formed sheet metal parts. A heat insulated container 40 defines a refrigerated compartment 42 for the storage of foods and the like and coacts with a heat insulating cover 43 to form a closed refrigerating chamber. For ease of access, even to articles placed in the bottom of the compartment 42, and so that the cover 43 may be utilized as a temporary loading and unloading shelf, I have so constructed my disclosed cabinet that the heat insulated container 40 may be opened for access to the interior by forward rocking movement during which the cover 43 remains in a substantially horizontal position and is handily disposed adjacent the open top of the insulated container when the container is moved to its open position.

Having more detailed reference to the structure by which the foregoing and other advantageous features of operation are attained, and referring more generally to Figs. 1 to 15, inclusive, the heat insulated container 40 has a bottom 44, front and rear walls 45 and 46, respectively, and end walls 47, which walls are desirably constructed with suitably shaped exterior and interior metal shells 48 and 49, respectively, secured together at the top by suitable means, such as welding, and between which is a substantial filling 50 of heat insulating material. Although other shapes might be utilized for similarly constructed cabinets, it is my preference in the present instance that the insulated cabinet 40 shall be rectangular in both transverse directions, and present a generally flat upper surface around the refrigerated compartment. As illustrated in Fig. 3, it is also my preference that the interior metal shell 49, in addition to providing a smooth inner lining for the container, shall also serve as a part of an evaporator 52 having tubes 53 for the evaporation of the refrigerant which cools the refrigerated compartment. For providing well distributed and effective refrigeration, the evaporator 52 covers the inner surfaces of the front and rear walls 45 and 46 and the end walls 47, so as completely to encircle the refrigerated compartment.

To support the heat insulated container for rocking movement between upright and forwardly tilted positions, as shown in Figs. 3 and 9, respectively, and to provide stable support for the container in each of those positions, I have provided metal plates 54 which are secured to each end of the container by suitable fastening means, such as rivets 55, and have lower edges 56 and 57 disposed in obtuse angular relationship. Each of the metal plates 54 carries a bearing 58 substantially at the vertex of the angularly disposed sides 56 and 57 which is rotatably carried by a shaft 59. Although suitable operation and tilting action are attainable with the axis of the shaft 59 disposed at different positions relative to the base 37, it is deemed preferable, in the present instance, that the axis be located substantially midway between the front and rear edges of the base 37. The shafts 59 on each side of the base are carried by suitable means, such as an angle iron base frame 60 which is secured to the lower edges of the end walls 38 of the outer casing and to the base 37.

The height of the metal end plates 54 is not only sufficient to provide a suitable obtuse angle between the lower edges 56 and 57 of the plate for supporting the insulated container in suitable upright and tilted positions, but is also desirably sufficient to provide room beneath the bottom of the insulated container for housing parts of the refrigeration apparatus of any desired type which are illustrated for exemplary purposes as a compressor unit 62 and a condenser unit 63. With this type of refrigeration apparatus, electrical connections are made to the compressor unit through a connector 64, mounted on the back wall 39 of the outer casing, and conductors such as 65.

In the form of my refrigerator cabinet depicted in Figs. 1 to 15, inclusive, the compressor unit 62 and condenser unit 63 are carried by suitable support strips extending between the lower edges of the metal end plates 54 so that those units move with the insulated container when it is tilted and have normal positions dependent upon the position of the container. In this instance the connections for the flow of refrigerant to and from the evaporator 52 are fixed relative to each of the parts of the refrigeration system and need not include any flexible connections. The conductors 65 are flexible to permit the movement of the electrically driven compressor unit. The positions assumed by the compressor unit and condenser unit when the container is in its upright and tilted positions are illustrated in Figs. 3 and 9, respectively.

With the parts of the refrigeration system housed within the outer casing 36, and between the base 37 and the bottom of the insulated container, it is necessary to provide for the circulation of cooling air through the condenser unit and around the compressor unit. For this reason the insulated container 40 is desirably secured to the base 37 in a position such that it is spaced forwardly from the back wall 39 of the outer casing 36, so as to provide a passage 66 for the flow of cooling air upwardly between those parts of the cabinet. The cooling air enters the space between the bottom of the insulated container 40 and the base 37 through the front.

Although a cover 67 is provided to improve the appearance of the lower portion of the front of the cabinet, the cover has a series of louvers 68 which permit the inward passage of cooling air through the cover. In order that the cover 67 may be free to move with the insulated container 40 when it is tilted, it is carried at its lower edge by a hinge 69 secured to the front margin of the base 37. Rotatably supported rollers 70 are desirably carried by the cover 67 near the upper edge thereof and engage the front surface of the insulated container to roll along the surface of the container as it is tilted. Resilient means, such as a tension spring 72, having one end connected to the cover and one end anchored to the base, biases the cover toward the container and maintains engagement of the roller 70 with the container.

In order to cushion the extremities of the tilting movements of the container 40 and to regulate its rate of movement in either direction, I have provided a fluid controlled dashpot 73 which has one end rotatably anchored to the back wall 39 of the outer casing by means such as a bracket 74, and its other end adjustably connected to the outer surface of the rear wall 46 of the insulated container through means such as a bracket 75. The action of the dashpot is such that it prevents quick or sudden movements of the container in either direction after the tilting has been started, and prevents jolts to the container or its contents at the extremities of the tilting movements.

To improve the outer appearance and smoothness of the cabinet, the front wall 45 of the insulated container desirably has laterally projecting side wings 76 extending to positions flush with the outer surfaces of the end walls 38 of the casing and engaging the front surfaces of those end walls when the container is in the upright position.

Since the container 40 tilts about an axis which is disposed between the front and rear walls thereof, the front wall 45 and the front portions of the end walls 47 have downward components of movement which accompany the forward tilting of the container; while the rear wall 46 and the rear portions of the end walls 47 have upward components of movement. Thus, in order for the cover 43 to clear the upper surface of the container during such tilting movement, while providing a relatively tight closure seal when the container is in the upright position, the cover must be moved upwardly away from the top of the container during the forward tilting movement and moved downwardly to the top of the container during its return movement. In order to effect the provision of additional relief for the separation of the cover from the top surface of the container along the rear edge of the container, I prefer to bevel the rear top surface of the container, as indicated at 77 in Figs. 3, 7 and 9. The cover 43 has a coacting sloping surface 78 along its rear edge. The slope of those coacting surfaces effects more direct separation and engagement between those parts of the surfaces during the initial separation and final closing movements.

As has been mentioned heretofore, I also consider it desirable that the cover 43 shall be supported in a horizontal position when the container is opened by tilting movement so that it may be utilized as a convenient shelf for the support of articles during the loading and unloading of the refrigerated compartment. In order to provide a substantial support for the cover 43, as well as to effect its upward and downward movements during the tilting of the container and without the necessity of separate manual operations, I have provided a cover raising and support mechanism which automatically actuates the cover in response to the tilting movements of the container. This mechanism includes forwardly extending side arms 79 which are disposed between the end walls 38 of the outer casing and the end walls 47 of the insulated container. Each of the forwardly extending side arms 79 is carried for linear vertical movement by vertically separated studs 80 and 82 located near the rear edge of the arm and slidable in slots 83 and 84, respectively, in brackets 85 and 86 which are secured to and carried by the back wall 39 of the casing, as depicted in Figs. 3, 7, 9 and 10. As illustrated in Fig. 10, the studs 80 preferably have end portions threaded into brackets, such as 87, secured to the inner surfaces of the arms 79. In the case of the upper studs 80, they extend through rearwardly projecting support bars 88 on opposite sides of the cover 43 to support the rear edge of the cover in addition to extending through the slots 83 in the brackets 85. At their forward ends the arms 79 are guided and supported for sliding movement by channels 89 carried by the end walls 38 of the casing, as shown in Fig. 11.

To provide an adjustable support for the front of the cover 43 from the forward end portions of the arms 79, I have provided screws 90 on each side of the cover which are threaded into brackets, such as 92 (Fig. 12), secured to the upper edges of the inner surfaces of the arms 79. The head portions of the screws 90 have a circumferential channel 93 in which a bifurcated end portion 94 of a cover support bracket 95 is mounted. While the screws 90 are rotatable relative to the bifurcated end portions of the brackets 95 to permit vertical adjustment of the position of the cover relative to the arms 79 and the upper surface of the insulated container 40, those end portions are retained within the channel in both vertical directions of movement to tie the cover and arms together for movement in both directions. The upper ends of the brackets 95 are secured to the outer edge portions of the cover.

Although various forms of motion translating mechanisms or linkages are usable for effecting vertical movement of the cover 43 in response to tilting movements of the container 40, the result is effected in the presently disclosed embodiment of my invention by camming means including a cam roller 96 rotatably supported on each side of the container 40 and coacting with the surfaces of a slot 97 in each of the arms 79. Each of the rollers 96 is rotatably supported by a screw 98 having an end portion threaded into a bracket 99 secured to the outer surface of the insulated container 40, as shown in Fig. 8. By preference, the shape of the slot is such that the initial tilting movement of the container 40 from its upright position effects a relatively quick and sudden rise of the cover 43 away from the upper surface of the container. After the initial separation of the cover from the container, the movement of the cover need only be sufficient to maintain a clearance between the cover and the container during the remainder of the tilting movement of the container. The rapid initial separation of the cover from the container is produced by an angularly disposed end portion 100 of the slot 97; while the remainder of the movement of the cover is controlled by the remaining relatively straight portion of the slot.

As shown in Fig. 7, the arcuate path of the rear edge portion of the container is substantially as indicated by the dot and dash line 102. During that movement of the container 40, the movement of the cover corresponding to the various angular positions of the container is substantially as indicated by the dot and dash line 103. A portion 104 of the line 103 depicts the rapid initial separation of the cover 43 and its rapid seating movement during the starting and completion of the container movements from and to the upright position.

When the container is moved from its upright position, as shown in Fig. 3, to the forwardly tilted position shown in Fig. 9, the side arms 79 are moved vertically and carry with them the cover 43. Fig. 7 provides a composite indication of the movement of the parts. During the forward tilting movement of the container 40, the cam roller 96 moves from the position shown in solid lines to that indicated in dot and dash lines at 96a. Coaction between the roller 96 and the edge of the slot 97 produces the upward movement of the arms 79 so that the slot reaches a position such as that depicted in dot and dash lines at 97a and the cover reaches substantially the position depicted by the dot and dash lines at 43a. The dot and dash lines 40a indicate the forwardly tilted position of the container.

Manual movement of the container 40 between its upright and tilted positions is facilitated by the provisions of a handle 105 which is secured to the front wall 45 of the container.

Although various forms and types of gaskets may be utilized to provide a tight seal between the cover 43 and the top surface of the insulated container 40, the present embodiment of my invention includes a gasket 106 which is made of a relatively flexible and wear-resistant heat insulating material and has a plurality of contacting surfaces engaging the cover and container, as shown in Fig. 6. The gasket 106 in this instance is secured to the cover by fastening means, such as rivets 107, along the inner and outer edges thereof, and has portions 108, 109 and 110 which engage the upper surface of the heat insulated container.

Adjustment of the screws 90, which interconnect the cover 43 and the arms 79, controls the angular position of the cover relative to those arms and also adjusts the level of the cover so that a tight squeeze is effected against the surfaces of the gasket thereby to produce a tightly sealed joint. In order further to insure a tight seal between the cover 43 and the top surface of the container 40, a tension spring 112 biases each of the arms 79 downwardly and thereby adds to the force of gravity in holding the cover 43 and its gasket against the upper surface of the container. One end of each of the springs 112 is anchored to a bracket 113 on the inner surface of the back wall 39 of the outer casing. The other end of each of the springs is connected to one of the arms 79. Having the parts thus held in their closed positions, no latch mechanism is required for the purpose.

Within the refrigerated compartment 42, the classification and location of the contents are facilitated by the use of movable and removable separators. In Figs. 13, 14 and 15, two types of separators are illustrated in an adaptation to the disclosed refrigerator cabinet. A heat conductive separator 114 made of a heat conductive material, such as metal, and desirably perforated with a multiplicity of air passages 115, is adapted to use for the separation or classification of the contents of one or more portions of the interior of the refrigerated compartment in instances such that practically the same temperature is desired on both sides of the partition. On the other hand, when a temperature differential is desired on the two sides of a partition, a heat insulating separator 116, which may either be made of heat insulating material or coated with such a material, is used to segregate the desired portions of the refrigerated compartment.

One manner of removably and adjustably supporting the separators within the refrigerated compartment is illustrated in Fig. 13. In this instance, a plurality of metallic channels 117 are secured in opposed and equally spaced relationship to opposite inner walls of the heat insulated container 40. Either of the types of separators 114 or 116 has end portions slidable into the channels 117 at a desired position. Although for illustrative purposes the channels 117 have been shown as continuous, it may be understood that they may comprise longitudinally separated sections, so as to permit lateral swinging movement accompanied by a relatively short linear movement for effecting the insertion or removal of the separators. As an example of one type of use for the insulated separator 116, that separator may be placed in a position near one end of the refrigerated compartment so as to segregate an end portion of the compartment having portions of the evaporator on three sides. Such use of the insulated separator is effective for segregating a portion of the refrigerated compartment for use in quickly freezing a quantity of food or the like. When two insulating separators are used to segregate a section near the mid-portion of the refrigerated compartment, that segregated portion has less evaporator area per unit of volume than the end portions.

The refrigerator cabinet illustrated in Figs. 16 to 20, inclusive, is generally similar in structure to that shown in Figs. 1 to 15, inclusive, except that the parts of the refrigeration system which are housed below the insulated container are mounted directly on the base, and in addition to having the cover raise automatically upon tilting the container, the cover may be swung upwardly to provide access to the refrigerated compartment. The foregoing description of the structure and operation of the refrigerator cabinet illustrated in Figs. 1 to 15, inclusive, is applicable to that of the form shown in Figs. 16 to 20, inclusive, except in respects which will be pointed out with particular reference to Figs. 16 to 20, inclusive, and it may be understood that reference numerals in the latter figures, which are similar to those previously used, refer to like parts.

With the compressor 62 and condenser 63 mounted directly on the base 37, as shown in Figs. 16 and 19, those parts remain stationary when the container is tilted. As a result, those parts and their weight need not be moved during the tilting of the container. It is necessary, however, to provide flexible elements in the connections between those parts of the refrigeration system and the evaporator which is carried within the container.

The cover 43 and cover raising mechanism including the arms 79, support brackets 85 and 86, cam roller 96, and slot 97, are generally similar in structure and operation to those illustrated in Figs. 3, 7 and 9. However, since it is desired that the cover 43 may be swung upwardly to a raised position providing access to the interior of the refrigerated compartment, as depicted in Fig. 19, the cover is releasably latched in the closed position and is otherwise free to swing upwardly about the axis of the studs 80 at its rear edge. As depicted in Figs. 16, 19 and 20, a screw 118, which is threaded into the bracket 92, provides an adjustable seat for an end portion 119 of a bracket 120 secured to the cover. The adjusted position of the screw 118 determines the position at which the vertical movement of the arms 79 becomes effective to raise the cover during the forward tilting movement of the container. The adjusted positions of the screws 118 is also such that when the container is in the upright position, the cover firmly and fully seats against the upper surface of the container.

Since there is no connection between the screw 118 and the bracket 120 by which the downward movement of the arms 79 applies a sealing force to the forward portion of the cover, the forward end of the cover is desirably latched in the closed position by a releasable latch mechanism 122, such as that illustrated in Fig. 17. The use of a latch mechanism of the type disclosed in Fig. 17 necessitates the application of manual pressure to a latch actuating knob 123 at the time force is applied for tilting the container or when it is desired to raise the cover without tilting the container. The latch actuating knob 123 has an inwardly extending plunger 124 which is slidably supported in the front wall of the container and is normally biased outwardly by a compression spring 125. Within a latch housing 126 a latch pawl 127 is supported for swinging movement by a shaft 128 and has an end portion 129 in alignment for engagement by the plunger 124 of the actuating member. At its other end the latch pawl 127 is notched for latching engagement with a latch plate 130 on an outer marginal portion of the cover. Normally the latch pawl is biased into a latching position by a spring 132. To effect release of the latch, the pawl is actuated by movement of the actuating knob 123; while latching of the pawl may be effected by downward movement of the cover 43 and the engagement of the beveled end surfaces of the latch plate 130 and pawl 127.

Although the cover 43 is hinged for upward swinging movement by the studs 80 upon the application of manual force to a knob 133 on the front of the cover, it is deemed preferable to provide means other than the continued application of manual force for holding the cover in the open position. For this purpose, and as depicted in Figs. 16, 18 and 19, the rearwardly extending support bars 88 have integral portions 134 extending downwardly and rearwardly therefrom which act as arms of a toggle mechanism. Telescopically engaging cylindrical parts 135 and 136 form a housing 137 which encloses a compression spring 138. The outer end of each of the housing parts 135 is rotatably connected to one of the downwardly extending portions 134 of the support bars 88 by fastening means, such as a cap screw 139. The opposite end of each of the other housing parts 136 is anchored for swinging movement by a cap screw 140 threaded into a bracket 142 which is secured to the inner surface of one of the arms 79. The normal angular dispositions of the support bar portions 134 and the axis of the springs 138 are such that the cover 43 is biased toward the closed position. However, when the cover 43 is raised, the action line of the compression spring 138 crosses a center line of movement to change the angular dispositions of the parts so that the springs 138 bias the cover to the open position and prevent it from closing until manual force is applied for that purpose.

Fig. 16 illustrates the relative positions of the parts of the refrigerator cabinet when it is closed.

In Fig. 19 the positions of the parts are illustrated as they appear when the cabinet is open. When desired, the cabinet may be opened by the forward tilting movement of the container 40, in which instance the cover 43 is raised to the position indicated by the dot and dash lines at 43b. In this position the bracket 120 rests against the head of the screw 118 to support the cover so that it may be used for a shelf. If desired, the cover may also be raised to a position such as that indicated in solid lines in Fig. 19 when the container 40 is either upright or tilted, and it will maintain that raised position due to the action of the spring 138 until returned to its level position.

Figs. 21 to 26, inclusive, illustrate what may be termed a dual refrigerator cabinet wherein two separate refrigerated compartments are provided in a single or unitary cabinet structure. In this type of cabinet one refrigerated compartment is adapted to use at temperatures below freezing for the preservation and storage of frozen foods; while the other compartment is adapted to the preservation of foods at temperatures above freezing. In addition to the conservation of space by the mounting of one such refrigerated compartment above the other, certain features of my disclosed refrigerator cabinet structures and design make possible the large refrigerator capacity in a small space, convenient access to all parts of the interior of both compartments, and ease of vision to various parts of the interior of either compartment. When one of the compartments is utilized for operation below freezing temperatures and the other is used for food preservation at temperatures above freezing, it is desirable that separate refrigeration systems should be used and alternately operated for the cooling of the compartments.

In my preferred construction, a lower cabinet 143 is utilized for operation at temperatures below freezing and is constructed substantially in accordance with the form illustrated in Figs. 16 to 20, inclusive, for opening either by forward tilting movement of the insulated container 40 or by the raising of the cover 43. Directly above the lower cabinet 143 is an upper cabinet 144 adapted to use for the storage of foods at temperatures above freezing. Mounted in side by side relationship on the base 37 for the cooling of the separated cabinets are the parts of separate refrigeration systems including compressor units 62A and 62B, and condenser units such as 63A.

An outer casing 145 has opposed end walls 146 and a back wall 147 which extend upwardly beyond the top of the lower cabinet 143 and to a height such that an upper cabinet of the desired volume is carried by and between the end walls 146 at a distance above the lower cabinet sufficient to permit the raising of the cover 43. Except for its height and necessary rigidity, the general structure of the outer casing 145 is quite similar to that utilized for the cabinets disclosed in Figs. 1 to 20, inclusive.

As illustrated in Fig. 24, the lower cabinet 143, like the cabinet shown in Figs. 16 to 20, inclusive, may be opened by tilting the container 40 forwardly to a position such as that shown in dot and dash lines at 40c. When the container is thus tilted forwardly, the cover 43 is raised automatically from the position shown in solid lines to that indicated in dot and dash lines at 43c. When desired, the cover 43 may be further raised manually to the position indicated in dot and dash lines at 43d.

For convenience of access and easy vision into the interior, the upper cabinet 144 desirably opens forwardly. It comprises a heat insulating container 148 having heat insulated walls constructed in substantially the same manner as those utilized in the previously described cabinet. In addition to being secured to the end walls 146 of the outer casing, the upper container 148 is additionally supported and reenforced by means including a transverse angle strip 149.

The evaporator utilized in the upper cabinet 144 is preferably of the type utilized in the cabinet depicted in Fig. 3, although other types of evaporator units will serve the desired purpose.

Since the height of the upper cabinet 144 is desirably such that it provides ease of vision into the interior for a person of ordinary size and ease of access for reaching into the interior, it may very well be opened within the limits of movement provided by a room of ordinary height by a cover 150 supported for upward movement across the opening rather than by an outward swinging movement into the room. Such movement of the cover across the opening has advantages in that it avoids the necessity of choice between right and left-hand swinging movement, does not require a large open space in front of the cabinet into which the cover may swing, and its movement does not create turbulence which effects an interchange of air between the room and the refrigerated compartment.

In the disclosed form of my cabinet and as illustrated in Fig. 24, the cover 150 is movably carried by a parallelogram type of support which includes an angle strip 152 secured to the rear surface of each outer side edge of the cover and to which rearwardly extending parallel arms 153 and 154 have their ends connected in spaced relationship for vertical swinging movement. The other ends of the arms 153 and 154 are rotatably supported for swinging movement about axes provided by means such as studs 155 and 156 carried by the end walls 146 of the outer casing.

A gasket 157, which may be of a type such as that disclosed in Fig. 6, is secured to the surfaces of the cover which form a seal with the front surfaces of the container and to the lower end surface of the cover which seats against a projecting end portion 158 of the lower wall of the container. By preference, an upper seating surface 159 of the projecting end portion 158 slopes inwardly so that the seating of the cover thereagainst tends to urge the other sealing surfaces of the cover into engagement with the container.

Since the cover 150 swings in an arcuate path by virtue of its being carried by the swinging ends of the arms 153 and 154 which swing about substantially fixed axes, it desirably engages the front surface of the container snugly when in the closed position, as shown in Fig. 24, and desirably engages the upper edge of the container when swung to the open position indicated in dot and dash lines at 150a. When moved to the open position, the arms 153 and 154 swing from the positions shown in solid lines in Fig. 24 to those indicated at 153a and 154a. Tight seating of the cover against the front surface of the container and complete closure of the cover are insured by providing some room for play between the studs 155 and 156 and the arms 153 and 154 which are supported thereby. In the present instance, openings 160 and 162, through which the studs 155 and 156 extend, are somewhat elongated. Tension springs, such as 163, at each side of the container and each having one end secured to the channel strip 152 and its other end adjustably anchored to a bracket 164 on the rear of the container, urge the cover toward engagement with the container. The lengths of the arms 153 and 154, however, are such that the cover moves out of its seating engagement with the container at each end of its path of movement and remains out of engagement during the intermediate portion of the movement. This minimizes the wear on the gasket 157. In order to lengthen the limits of movement of the cover 150, side portions 165 extend downwardly beyond the seating surface 159 to provide lower anchoring positions for the front ends of the arms 153 and thus increase their lengths and the resultant paths of movement.

In order to obtain the maximum range of movement of the cover 150 within a given space, the arms 153 and 154 desirably swing equidistantly on either side of their respective center lines of movement. Such movement of the arms makes the arcuate path of the cover symmetrical with respect to the front surface of the container. In the upper position a positive stop is desirably provided for the cover 150. For this purpose I have utilized straps 166 secured to opposite ends of the container and having outwardly extending ends 167 which engage the arms 156 at their upper limit of angular movement.

The angular disposition of the tension springs 163 is such that in the closed position of the cover they provide a supplementary force tending to urge the cover into sealing engagement with the container, as well as tending to raise the cover to the open position. In the open position of the cover the springs 163 exert a component of force which biases the cover to that open position and retains it in such position until manually closed. To attain this result the action line of the springs 163 crosses a line at which their direction of biasing force changes relative to the direction of movement of the cover. Fluid controlled dashpots, such as 168, are desirably connected to the arms 153 and anchored to the ends of the container to cushion the motion of the cover 150, at least in the downward direction. Such dashpots prevent the cover from dropping forcibly against the lower seating surface 159 if accidentally dropped.

A handle 169 mounted on the front surface of the cover 150 is provided for gripping the cover during its opening and closing movements. To insure the retention of the cover 150 in a tightly closed position, a releasable latch mechanism 122, which may be of the construction illustrated in Fig. 17, is mounted in the projecting end portion 158 of the lower container wall and has the exposed actuating knob 123 for effecting its release.

Tight sealing engagement of the upper portion of the cover 150 against the front surface of the insulated container 148 is desirably insured by a supplementary wedging attachment such as that illustrated in Fig. 23. An angle bracket 170 is secured in a recessed portion 172 of the upper edge surface of the cover 150 and has an inwardly projecting portion which carries an adjustable and downwardly projecting cap screw 173. Secured in an adjacent recessed portion of the insulated container 148 is a recessed fitting 174 having an upwardly extending and tapered wedge portion 175. Upon upward movement of the cover 150 relative to the container 148, the screw 173 moves away from the wedge-like portion 175 of the fitting. However, upon reaching a seating position, the adjustment of the screw 173 is such that its engagement with the wedge-like portion 175 draws the cover inwardly toward the container to effect a tight seal as well as to serve as a supplementary stop for the downward movement of the cover.

In the form of my refrigerator cabinet depicted in Figs. 21 to 26, inclusive, separate refrigerated containers are provided in a unitary structure, each of which containers is easily accessible and disposed at a convenient level. In addition, space is provided between the containers which may be utilized for general utility purposes.

In Figs. 27 to 31, inclusive, an additional modified form of my refrigerator cabinet is illustrated. Like the form of my cabinet depicted in Figs. 21 to 26, inclusive, the cabinet shown in Figs. 27 to 31, inclusive, serves a dual purpose by having two separate refrigerated compartments in a unitary refrigerator structure. In the latter cabinet, however, the upper and lower containers are closely spaced in the vertical direction, the utility space between the containers is omitted, and the cabinet generally presents a compact unit having large storage capacity in comparison with its occupied space.

The general structure of the casing and the refrigeration system, as well as the structure of the upper refrigerated container, is similar to that illustrated in Figs. 21 to 26, inclusive, and previously described. Although the general structure of the lower refrigerated container and the cover raising mechanism is quite similar to that previously described, the cover raising mechanism in the present instance has been altered in certain respects.

As in the form depicted in Figs. 1 to 15, inclusive, the cover 43 for the lower container in Figs. 27 to 31, inclusive, is supported for linear vertical movement by the forwardly projecting arms 79 and is connected to those arms for movement in both directions by the slotted screws 90 and brackets 95 having the bifurcated end portions 94 which extend into the circumferential channel 93 of the screws. Springs 112 acting upon the arms 79 bias the cover 43 into seating engagement with the upper surface of the insulated container 40.

However, instead of the cam rollers 96 and the coacting slots 97 in the arms 79 of the previously described forms of my invention, I have provided rollers 176 carried by shafts 177 and mounted for rotation in recesses 178 in the upper edges of the insulated container 40, which rollers engage the lower surface of the cover 43 to move it upwardly during the outward rocking movement of the container. By preference the rollers are disposed substantially at the intersection of the beveled surface 77 with the upper plane surface of the container so that in the closed position, as depicted in Fig. 31, the rollers are substantially tangent to the angularly disposed surfaces of the cover near the rear edge thereof. When the container 40 is tilted forwardly to a position such as that indicated in dot and dash lines at 40e in Fig. 30, the rollers move along the lower surface of the cover 43 to raise the cover to a position such as that depicted in dot and dash lines at 43e. Engagement between the rollers 176 and the cover sealing gaskets is prevented by utilizing two separated gaskets 179 and 180 secured to the cover 43 in parallel relationship by fastening means, such as rivets 182, as disclosed in Fig. 28. The rollers thus engage the metallic surface of the cover 43.

In order to improve the appearance of the front of the cabinet and to provide an enclosure for the front surface of the cover 43, a removable apron 183 is provided. As shown in Figs. 27, 29 and 30, the apron 183 has an exposed outer portion 184 and a narrower inner extension 185, which extension is slidable into channels provided by angle brackets 186 on the lower surface of the upper container 148 to support the apron.

In the various forms of refrigerator cabinets disclosed and described herein, the refrigerated compartments may be opened by a relative lateral movement between the heat insulated container and its coacting cover. Such relative lateral movement has very little tendency to effect turbulence of the air adjacent the opening as the movement occurs and, consequently, limits to a very great extent the interchange of air between the interior and exterior of the refrigerated compartment. Such interchange of the air is not only detrimental because of the accompanying heat loss but also because of the usual interchange of moisture and the resultant frosting of the interior of the refrigerated compartment.

While I have illustrated a preferred embodiment of my invention, many modifications may be made without departing from the spirit of the invention, and I do not wish to be limited to the precise details of construction set forth, but desire to avail myself of all changes within the scope of the appended claims.

Having thus described my invention, what I claim as new and desire to secure by Letters Patent of the United States, is:

1. A tiltable cabinet comprising, in combination, an outer casing including a base, a back wall and oppositely disposed end walls, a box-like housing having an open top and fitting between said end walls of the outer casing, means carrying said box-like housing at a distance above the base for rocking movement from and toward said back wall to forwardly tilted and upright positions, stop means for supporting the box-like housing in each of said positions, hingedly supported means covering the space between the base and box-like housing along the front surface of the box-like housing, said hingedly supported means being movable with the box-like housing, resilient means biasing the hingedly supported means toward the box-like housing, a cover for closing the open top of the box-like housing, means hingedly supporting the cover relative to the back wall of the casing for angular swinging movement relative to the top of the box-like housing to permit opening and closing of the box-like housing when it is in said upright position, and a mechanism interconnecting the box-like housing and cover for raising the cover vertically to a height sufficient to clear the box-like housing during said rocking movement thereof and while maintaining said cover in substantially horizontal planes.

2. A tiltable cabinet comprising, in combination, an outer casing including a base, a back wall and oppositely disposed end walls, a box-like housing having an open top and fitting between said end walls of the outer casing, means carrying said box-like housing at a distance above the base for rocking movement from and toward said back wall to forwardly tilted and upright positions, stop means for supporting the box-like housing in each of said positions, hingedly supported means covering the space between the base and box-like housing along the front surface of the box-like housing, said hingedly supported means being movable with the box-like housing, resilient means biasing the hingedly supported means toward the box-like housing, a cover for closing the open top of the box-like housing, and a mechanism operated by movements of the box-like housing for raising the cover vertically to a height sufficient to clear the box-like housing during said rocking movement thereof while maintaining the cover in substantially horizontal planes.

3. A tiltable cabinet comprising, in combination, an outer casing including a base, a back wall and oppositely disposed end walls, a box-like housing having an open top and fitting between said end walls of the outer casing, means carrying said box-like housing at a distance above the base for rocking movement from and toward said back wall to forwardly tilted and upright positions, stop means for supporting the box-like housing in each of said positions, a cover for closing the open top of the box-like housing, means hingedly supporting the cover relative to the back wall of the casing for angular swinging movement relative to the top of the box-like housing to permit opening and closing of the box-like housing when it is in said upright position, and a mechanism responsive to rocking movements of the box-like housing for raising the cover vertically to a height sufficient to clear the box-like housing during said rocking movement thereof and while maintaining the cover in substantially horizontal planes.

4. A tiltable cabinet comprising, in combination, an outer casing including a base, a back wall and oppositely disposed end walls, a box-like housing having an open top and fitting between said end walls of the outer casing, means carrying said box-like housing at a distance above the base for rocking movement from and toward said back wall to forwardly tilted and upright positions, stop means for supporting the box-like housing in each of said positions, a cover for closing the open top of the box-like housing, and a mechanism responsive to rocking movements of the box-like housing for raising the cover vertically to a height sufficient to clear the box-like housing during said rocking movement thereof while maintaining the general plane of the cover substantially horizontal.

5. A tiltable cabinet comprising, in combination, support means including a base having front and back edges and an upright support element secured to the base, a box-like housing having walls and an open top, means providing an axis disposed between said front and back edges of the base and supporting said box-like housing for rocking movement relative to the base and between upright and forwardly tilted positions, brackets secured to said upright support element near opposite ends of the box-like housing, arms projecting forwardly from said brackets along said opposite ends of the box-like housing, means supporting said arms from said brackets for linear vertical movement relative thereto, each of said arms having a cam slot therein, a cam roller carried on each side of said box-like housing and coacting with the cam slot of one of said arms, the shapes of said cam slots being such that rocking movement of the box-like housing effects non-uniform vertical movement of the arms between predetermined limits, a cover for the open top of said housing, said cover being carried by said arms so that said non-uniform vertical movement provides clearance between the cover and the top of the box-like housing during the rocking movement of said housing from and toward said upright position, adjustable means connecting the cover to the extending ends of the arms, dashpot means for controlling the extremities of said rocking movement of the housing, and resilient means for biasing the arms in one direction of vertical movement to effect a tight seal between said housing and cover when the housing is in the upright position.

6. A cabinet comprising, in combination, support means including a base having front and back edges and an upright support element secured to the base, a box-like housing having walls and an open top, means providing an axis and supporting said box-like housing for rocking movement relative to the base between upright and forwardly tilted positions, arms projecting forwardly along said opposite ends of the box-like housing, means supporting said arms from the upright support element for linear vertical movement relative thereto, each of said arms having a cam slot therein, a cam roller carried on each side of said box-like housing and coacting with the cam slot of one of said arms, said cam slots having angularly disposed substantially linear portions such that rocking movement of the box-like housing effects non-uniform vertical movement of the arms between predetermined limits, a cover for the open top of said housing, said cover being carried by said arms so that said non-uniform vertical movement provides clearance between the cover and the top of the box-like housing during the rocking movement of said housing from and toward said upright position, a flexible gasket mounted for engagement between the margin of the cover and the top edge of the housing for effecting a tight seal between said housing and cover when the housing is in the upright position.

7. A cabinet comprising, in combination, support means including a base having front and back edges and an upright support element secured to the base along its back edge, a box-like housing having walls and an open top, means supporting said box-like housing for rocking movement relative to the base and between upright and forwardly tilted positions, arms projecting forwardly from said support means along opposite ends of the box-like housing, means supporting said arms for vertical movement relative to the support means, means for movably connecting the box-like housing and said arms to effect vertical movement of the arms between predetermined limits during rocking movement of the box-like housing, a cover for the open top of said housing and carried by said arms for movement therewith, means for hingedly connecting said cover to the arms for vertical swinging movement about an axis along one edge of the cover to provide access to the interior of the box-like housing when it is in said upright position, means for biasing the cover to open and closed positions, the vertical movement of said cover with said arms providing clearance between the cover and housing during rocking movement of the housing, and latch means for releasably locking the cover in a closed position relative to the box-like housing.

8. A cabinet comprising, in combination, support means including a base having front and back edges and an upright support element secured to the base, a box-like housing having walls and an open top, means supporting said box-like housing for rocking movement relative to the base and between upright and forwardly tilted positions, arms projecting forwardly from said support element along opposite ends of the box-like housing, means supporting said arms for vertical movement relative to the support element, means for movably connecting the box-like housing and said arms to effect vertical movement of the arms between predetermined limits during rocking movement of the box-like housing, and a cover for the open top of said housing and carried by said arms for movement therewith, the vertical movement of said cover with said arms providing clearance between the cover and housing during rocking movement of the housing.

9. In a tiltable cabinet for storage and the like, the combination comprising a container having a bottom and an open top, means supporting said container for rocking movement between upright and tilted positions about an axis near the bottom thereof, a cover for the open top of said container when said container is in the upright position, support means carrying said cover and movable vertically through substantially parallel planes so as to retain said cover in substantially horizontal positions, motion translating means connecting said container and cover for effecting such vertical movement of the cover during rocking movement of the container to and from the tilted position, and movable partitioning means dividing said container into a plurality of compartments of selected sizes.

10. In a tiltable cabinet for storage and the like, the combination comprising a container having a bottom and an open top, means supporting said container for rocking movement between upright and tilted positions about an axis near the bottom thereof, a cover for closing the open top of said container when said container is in the upright position, support means carrying said cover and movable vertically through substantially parallel planes so as to retain said cover in substantially horizontal positions, means for moving said support means and cover vertically to clear the top of said container during rocking movement thereof to and from said tilted position, said cover providing a shelf adjacent the open top of the container when the container is in said tilted position, and movable partitioning means dividing said container into a plurality of compartments of selected sizes.

11. In a tiltable cabinet, the combination comprising a container having an opening in the top, means supporting the container for rocking movement between upright and tilted positions, the top of said container being substantially horizontal when the container is in said upright position, a cover for the top of the container, cover support means movable toward and from the container in a direction substantially perpendicular to the plane of the cover, means for adjusting the position of the cover relative to the support to effect a tight seal between the cover and container when the container is in the upright position, means for biasing the cover toward the container, and cam rollers on the container and engaging the cover to effect movement of the cover during rocking movement of the container.

12. In a tiltable cabinet having a chamber, the combination comprising coacting container and cover members each having walls and defining said chamber, means including a base and parts interconnecting the container and cover members for supporting said container and cover members for movement relative thereto and relative to one another and so that movement of one of the members effects corresponding movement of the other, said cover normally being substantially horizontal and maintaining its substantially horizontal disposition during said movement, said container being angularly movable to an open position adjacent and at one side of the cover.

13. A tiltable cabinet comprising, in combination, support means including a base having front and back edges and an upright support element secured to the base along the back edge thereof, a box-like housing having walls and an open top, means providing an axis disposed between said front and back edges of the base and supporting said box-like housing for rocking movement relative to the base and between upright and forwardly tilted positions, brackets secured to said upright support element near opposite ends of the box-like housing, arms projecting forwardly from said brackets along said opposite ends of the box-like housing, means supporting said arms from said brackets for linear vertical movement relative thereto, each of said arms having a cam slot therein, a cam roller carried on each side of said box-like housing and coacting with the cam slot of one of said arms, the shapes of said cam slots being such that rocking movement of the box-like housing effects non-uniform vertical movement of the arms between predetermined limits, a cover for the open top of said housing, said cover being carried by said arms so that said non-uniform vertical movement provides clearance between the cover and the top of the box-like housing during the rocking movement of said housing from and toward said upright position, adjustable cover supports at the extending ends of said arms effective during movement of the housing and arms for actuating the cover, and means for effecting a tight seal between said housing and cover when the housing is in the upright position.

14. A tiltable cabinet comprising, in combination, support means including a base having front and back edges and an upright support element secured to the base along the back edge thereof, a box-like housing having walls and an open top, means providing an axis disposed between said front and back edges of the base and supporting said box-like housing for rocking movement relative to the base and between upright and forwardly tilted positions, brackets secured to said upright support element near opposite ends of the box-like housing, arms projecting forwardly from said brackets along said opposite ends of the box-like housing, means supporting said arms from said brackets for linear vertical movement relative thereto, each of said arms having a cam slot therein, a cam roller carried on each side of said box-like housing and coacting with the cam slot of one of said arms, the shapes of said cam slots being such that rocking movement of the box-like housing effects non-uniform vertical movement of the arms between predetermined limits, a cover for the open top of said housing, the cover being carried from said arms during movement of the housing by aligned connecting elements at one edge of the cover and adjustable support elements at the projecting ends of the arms so that said non-uniform vertical movement provides clearance between the cover and the top of the box-like housing during the rocking movement of the housing from and toward said upright position.

15. A tiltable cabinet comprising, in combination, support means including a base having front and back edges and an upright support element secured to the base, a box-like housing having walls and an open top, means providing an axis disposed between said front and back edges of the base and supporting said box-like housing for rocking movement relative to the base and between upright and forwardly tilted positions, a cover for the open top of said housing, brackets secured to said upright support element near opposite ends of the box-like housing, arms projecting forwardly from said brackets along said opposite ends of the box-like housing, means for supporting said arms from said brackets for linear vertical movement relative thereto, each of said arms having a movable connection to said cover through studs aligned on an axis extending along one edge of the cover, adjustable elements spaced from said studs and providing secondary spacers between the arms and said cover, coacting cam elements on said box-like housing and on the arms for effecting vertical movement of the cover and arms during movements of the housing from and toward said upright position, and resilient means for biasing the cover into engagement with the housing when the housing is in the upright position.

CHARLES G. MINOR.

REFERENCES CITED

The following references are of record in the file of this patent:

UNITED STATES PATENTS

| Number | Name | Date |
| --- | --- | --- |
| 525,750 | Swink | Sept. 11, 1894 |
| 1,443,858 | Windecker | Jan. 30, 1923 |
| 1,876,407 | Frazier | Sept. 6, 1932 |
| 2,096,256 | Mitchell | Oct. 19, 1937 |
| 2,386,929 | Brown | Oct. 16, 1945 |
| 2,401,613 | Charland | June 4, 1946 |